|   | United States Patent [19] | [11] | Patent Number: | 4,588,914 |
|---|---|---|---|---|
|   | Heyne | [45] | Date of Patent: | May 13, 1986 |

[54] PERMANENT MAGNET ROTOR FOR HIGH SPEED MOTORS AND GENERATORS

[75] Inventor: Carl J. Heyne, Hampton Township, Allegheny County, Pa.

[73] Assignee: Westinghouse Electric Corp., Pittsburgh, Pa.

[21] Appl. No.: 617,455

[22] Filed: Jun. 5, 1984

[51] Int. Cl.⁴ .......................................... H02K 21/14
[52] U.S. Cl. ...................... 310/156; 310/42
[58] Field of Search .................. 29/598; 310/42, 156, 310/213, 214, 216, 218, 256, 261

[56] References Cited

U.S. PATENT DOCUMENTS

| 887,521 | 5/1908 | Reist | 310/218 |
|---|---|---|---|
| 1,369,765 | 3/1921 | Alexander | 310/218 |
| 4,323,802 | 4/1982 | Leistner | 310/214 |
| 4,354,126 | 10/1982 | Yates | 310/156 |
| 4,445,062 | 4/1984 | Glaser | 310/156 |

FOREIGN PATENT DOCUMENTS

| 1166907 | 11/1958 | France | 310/261 |
|---|---|---|---|
| 281551 | 7/1952 | Switzerland | 310/261 |

OTHER PUBLICATIONS

"Advanced High-Power Generator for Airborne Applications", Airesearch Mfg. Co., Tech. Report AF-WAL-80-2130, Dec. '80, 76 pages.

Primary Examiner—Patrick R. Salce
Assistant Examiner—D. L. Rebsch
Attorney, Agent, or Firm—R. P. Lenart

[57] ABSTRACT

A permanent magnet rotor for high speed motors and generators is constructed to minimize tensile stress on the magnet material by preloading the material with a radially inward compressive force. In the two-pole configuration, this force is provided by wedges inserted into a dovetail connection between a pole piece and a nonmagnetic support structure. In a configuration having four or more poles, drive wedges are inserted between a magnetic pole piece and a retaining wedge to produce a compressive force on bar magnets which produce a circumferentially oriented magnetic field.

5 Claims, 6 Drawing Figures

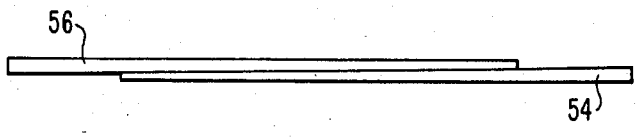
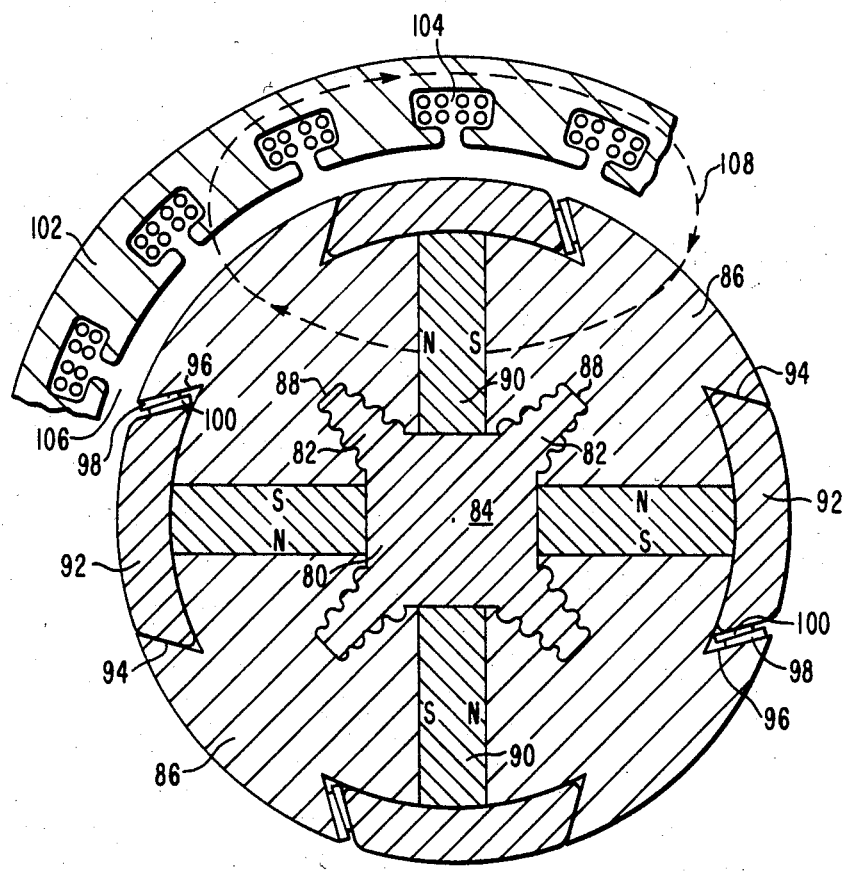

PERMANENT MAGNET ROTOR FOR HIGH SPEED MOTORS AND GENERATORS

BACKGROUND OF THE INVENTION

This invention relates to dynamoelectric machines and more particularly to permanent magnet rotors for use in such machines.

High power density, lightweight generators and motors have been used for many years in military and commercial aircraft. A requirement for lightweight units has resulted in the design of higher speed motors and generators to maximize the power to weight ratios of the units. Recent advances in permanent magnet materials, such as the development of ferrite and rare earth compounds, have allowed designers to further increase the power density of rotating airborne electrical equipment.

The use of permanent magnet materials in high speed rotating electrical equipment poses a number of problems with respect to material support and the definition of magnetic flux paths which have hindered the application of these materials to very high speed machines. U.S. Pat. No. 4,354,126, issued Oct. 12, 1982, to W. W. Yates discloses a permanent magnet rotor which illustrates the current state of the art. In the disclosed rotor, a plurality of permanent magnets are embedded in rotor slots and are arranged in combination with a plurality of magnetic pole pieces to form a series of magnetic poles on the surface of the rotor. These magnetic poles force flux through several paths within the machine. The path which links the stator windings and produces useful torque is known as the main flux path. Other paths which do not link the stator winding circuit produce no torque and are commonly called leakage flux paths.

A primary design consideration in permanent magnet machines which utilize ferrite and rare earth magnet compounds is the minimization of leakage flux paths. Several permanent magnet rotor designs have been proposed which required the bonding of magnetic and nonmagnetic materials in a high speed rotor configuration. This type of bonding is difficult to implement in the rotor manufacturing process.

SUMMARY OF THE INVENTION

The present invention seeks to provide a permanent magnet rotor configuration in which leakage flux is minimized, metallurgical bonding of magnetic and nonmagnetic materials is not required, complete support for the permanent magnets is provided, and magnetic tensile stress is reduced by placing the magnets in compression during assembly. These advantages are achieved in a rotor which can be assembled in a straightforward manner.

A two-pole permanent magnet rotor for a dynamoelectric machine constructed in accordance with one embodiment of the present invention comprises: a nonmagnetic structure having a central axis, a central cavity, two diametrically opposed arcuate peripheral surfaces, and two additional diametrically opposed surfaces, each having a dovetail mating element extending parallel to the axis; a pair of magnetic pole pieces, each having an arcuate peripheral surface and an internal surface including a longitudinal dovetail mating element forming a dovetail joint with one of the dovetail mating elements of the nonmagnetic structure; a permanent magnet positioned within the central cavity such that each pole of the permanent magnet lies adjacent to an internal surface of one of the magnetic pole pieces; and a plurality of tapered drive wedges positioned between one side of each of the dovetail mating elements of the magnetic pole pieces and an adjacent side of the dovetail mating element of the nonmagnetic structure, such that a radially inward compressive force is exerted on the permanent magnets by the internal surface of each of the pole pieces. In the two-pole configuration, the permanent magnet produces a radially oriented field.

A permanent magnet rotor having four or more poles and constructed in accordance with this invention comprises: a nonmagnetic support structure having a central core and a plurality of fir tree projections extending radially from the central core and extending longitudinally in parallel with the axis of the core; a plurality of magnetic pole pieces each having a fir tree groove with a cross-sectional shape corresponding to the cross-sectional shape of one of the fir tree projections wherein the magnetic pole pieces are mounted on the support structure such that each support structure fir tree projection extends into a corresponding pole piece fir tree groove to prevent radially outward movement of the pole piece; a plurality of bar shaped permanent magnets extending longitudinally through slots formed between the pole pieces and extending radially from the central core; wherein the magnetic axis of each of the magnets is circumferentially disposed; each of the permanent magnets being secured against radially outward movement by a nonmagnetic retaining wedge extending longitudinally along the outer periphery of the rotor and extending circumferentially between slots in adjacent ones of the magnetic pole pieces; and a plurality of tapered drive wedges each positioned between one side of each of the slots in the pole pieces and an adjacent side of one of the retaining wedges such that a radially inward compressive force is exerted on each of the permanent magnets by an adjacent retaining wedge.

BRIEF DESCRIPTION OF THE DRAWINGS

FIG. 5 is an elevation view of a pair of drive wedges which are used in the rotor structures of FIGS. 3 and 4; and FIG. 6 is a partial cross-sectional view of a dynamoelectric machine incorporating a four-pole permanent magnet rotor constructed in accordance with another alternative embodiment of this invention.

DESCRIPTION OF THE PREFERRED EMBODIMENTS

Figure 1:
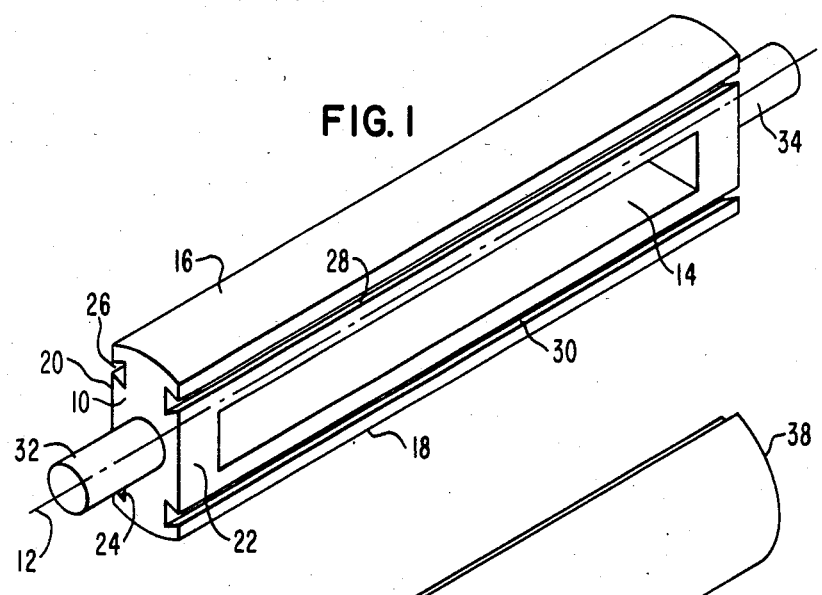
FIG. 1 is a pictorial view of a nonmagnetic structural portion of a two-pole rotor constructed in accordance with one embodiment of the present invention.

Referring to the drawings, FIG. 1 is a pictorial view of a nonmagnetic rotor structure 10 which may be used in the construction of a two-pole permanent magnet rotor in accordance with one embodiment of the present invention. The nonmagnetic structure 10 includes a central axis 12, a central cavity 14, two diametrically opposed arcuate peripheral surfaces 16 and 18 and two diametrically opposed generally flat surfaces 20 and 22. Each of these flat surfaces includes a pair of dovetail mating elements in the form of longitudinal slots 24, 26, 28 and 30. A pair of stub shafts 32 and 34 are connected to opposite ends of the rotor body and are aligned along the central axis 12 of the nonmagnetic structure 10.

Figure 2:
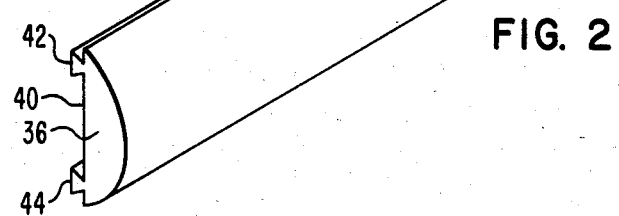
FIG. 2 is a pictorial view of a magnetic pole piece for use with the structure of FIG. 1.
Figure 3:
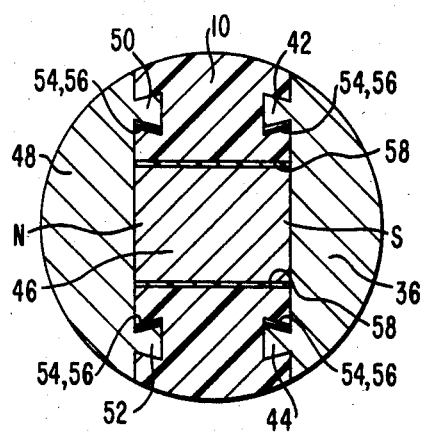
FIG. 3 is a cross-sectional view of a two-pole rotor incorporating this structures of FIGS. 1 and 2.

FIG. 2 is a pictorial view of a magnetic steel pole piece 36 having an arcuate peripheral surface 38 and a generally flat internal surface 40 which includes a pair of longitudinal dovetail mating elements in the form of a pair of longitudinal dovetail projections 42 and 44. These projections are sized to fit within the dovetail slots in the generally flat sides of the nonmagnetic structure 10. FIG. 3 is a cross-sectional view of a two-pole rotor which has been formed by combining the elements of FIGS. 1 and 2 and inserting a permanent magnet 46 into the central cavity 14 of the nonmagnetic structure 10. The magnetic axis of this permanent magnet is perpendicular to the central axis 12 of the rotor. Magnet pole piece 36 is shown with its dovetail projections 42 and 44 inserted to form a clearance fit within the dovetail slots in one of the generally flat sides of the nonmagnetic structure 10. Similarly, magnetic pole piece 48 is shown to have dovetail projections 50 and 52 which lie within the dovetail slots of the other generally flat side of the nonmagnetic structure. A plurality of tapered drive wedges 54 and 56 are shown to be positioned between one side of each dovetail projection and an adjacent side of each corresponding dovetail slot. By inserting these tapered drive wedges, a radially inward compressive force is exerted on permanent magnet 46 by the internal surfaces of each of the magnetic pole pieces 36 and 48. Careful dimensional control of the nonmagnetic rotor body structure and the permanent magnet will allow the desired precompression force to be applied. An impregnating material such as an epoxy 58 has been inserted into the central cavity 14 of the nonmagnetic rotor body in order to completely fill all voids between the sides of the central cavity and the permanent magnet, thereby completely supporting the permanent magnet material.

Figure 4:
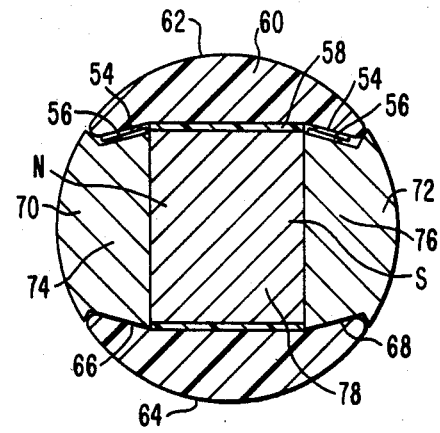
FIG. 4 is a cross-sectional view of an alternative embodiment of a two-pole rotor constructed in accordance with this invention.

FIG. 4 is a cross-sectional view of an alternative embodiment of the present invention wherein the nonmagnetic structure 60 includes two diametrically opposed arcuate surfaces 62 and 64 and two diametrically opposed dovetail mating elements in the form of dovetail slots 66 and 68. The magnetic pole pieces 70 and 72 are then fashioned with longitudinal dovetail mating elements in the form of dovetail projections 74 and 76. These dovetail projections are then inserted into the dovetail slots of the nonmagnetic structure 60 and act to apply radially inward compressive forces to the permanent magnet 78 when drive wedges 54 and 56 are inserted. FIG. 5 shows a longitudinal view of the drive wedges used in the rotors of FIGS. 3 and 4. It should be understood that various types of dovetail mating elements can be used, as long as the insertion of drive wedges places the magnet in compression. This is generally accomplished with a slot and projection combination having non-parallel sides.

FIG. 6 is a partial cross-sectional view of a four-pole dynamoelectric machine which includes a permanent magnet rotor constructed in accordance with another alternative embodiment of the present invention. A nonmagnetic support structure 80 in the form of a nonmagnetic steel shaft includes a plurality of fir tree projections 82 which extend radially from a central core 84 and also extend longitudinally in parallel with the central axis of the core. A plurality of magnetic pole pieces 86, each having a fir tree groove 88 with a cross-sectional shape which corresponds to the cross-sectional shape of one of the fir tree projections of the nonmagnetic support structure, are mounted on the support structure such that each support structure fir tree projection extends into a corresponding pole piece fir tree groove to prevent radial movement of the pole pieces. The assembly of these magnetic pole pieces creates a plurality of slots into which bar-shaped permanent magnets 90 have been longitudinally inserted. The magnetic axis of each of these bar-shaped magnets produces circumferentially disposed magnetic flux. Each of the permanent magnets is secured against radially outward movement by a nonmagnetic retaining wedge. These retaining wedges extend longitudinally along the outer periphery of the rotor and also extend circumferentially between slots 94 and 96 in adjacent ones of the magnetic pole pieces. A plurality of tapered drive wedges 98 and 100 are positioned between one side of each of the slots in the magnetic pole pieces and an adjacent side of one of the retaining wedges, such that a radially inward compressive force is exerted on each of the permanent magnets by an adjacent one of the retaining wedges. The four-pole rotor of FIG. 6 is used in a dynamoelectric machine which includes a stator housing 102 having a plurality of stator winding coils 104 which produce a rotating magnetic field that is used to drive the rotor. An annular gap 106 is formed between the stator housing and the rotor. The main flux path 108 of one of the permanent magnets 90 is shown to extend circumferentially through the magnet and also circumferentially through a portion of the stator structure.

The permanent magnet rotors of this invention have been designed to minimize leakage flux, to provide complete support for the permanent magnets, and to reduce tensile stress on the magnets by placing the magnets in compression during assembly and completely supporting the magnet material. This has been accomplished in a structure which does not require the metallurgical bonding of magnetic and nonmagnetic steels. The resulting structure is mechanically robust and therefore suitable for very high speed drives, for example in the range of 12,000 to 24,000 rpm, such as those required for centrifuges and aerospace applications.

Although the present invention has been described in terms of what are at present believed to be its preferred embodiments, it will be apparent to those skilled in the art that various changes may be made without departing from the scope of the invention as defined by the appended claims.

What is claimed is:

1. A two-pole permanent magnet rotor for a dynamoelectric machine comprising:

a nonmagnetic structure having a central axis, a central cavity, two diametrically opposed arcuate peripheral surfaces, and two diametrically opposed dovetail mating elements extending parallel to said axis;

a pair of magnetic pole pieces, each having an arcuate peripheral surface and an internal surface including a longitudinal dovetail mating element forming a dovetail joint with one of said dovetail mating elements of said nonmagnetic structure;

a permanent magnet positioned within said central cavity such that each pole of said permanent magnet lies adjacent to the internal surface of one of said magnetic pole pieces; and a plurality of tapered drive wedges, positioned between one side of each of said dovetail mating elements of said magnetic pole pieces and an adjacent side of a dovetail mating element of said nonmagnetic structure, such that a radially inward compressive force is exerted on said permanent magnet by the internal surface of each of said pole pieces.

2. A two-pole permanent magnet rotor for a dynamoelectric machine as recited in claim 1, further comprising:
   a pair of stub shafts, connected to opposite ends of said nonmagnetic structure and aligned with the central axis of said nonmagnetic structure; and
   an impregnating material filling all voids between the sides of said central cavity and said permanent magnet.

3. A two-pole permanent magnet rotor for a dynamoelectric machine comprising:
   a nonmagnetic structure having a central axis, a central cavity, two diametrically opposite arcuate surfaces, and two diametrically opposite generally planar surfaces wherein each of said generally planar surfaces includes two dovetail slots on opposite sides of said central cavity and extending parallel to said central axis;
   a pair of magnetic pole pieces, each having an arcuate surface and a generally planar surface opposite to said arcuate surface wherein said generally planar surface includes two longitudinal dovetail projections shaped to form a clearance fit within said dovetail slots in said nonmagnetic structure;
   a permanent magnet positioned within said central cavity such that each pole of said permanent magnet lies adjacent to the generally planar surface of one of said magnetic pole pieces; and
   a plurality of tapered drive wedges, each positioned between one side of one of said dovetail projections and an adjacent side of one of said dovetail slots, such that a radially inward compressive force is exerted on said permanent magnet by each generally planar surface of said pole pieces.

4. A two-pole permanent magnet rotor for a dynamoelectric machine as recited in claim 3, further comprising:
   a pair of stub shafts, connected to opposite ends of said nonmagnetic structure and aligned with the central axis of said nonmagnetic structure; and
   an impregnating material filling all voids between the sides of said central cavity and said permanent magnet.

5. A multiple pole, permanent magnet rotor of a dynamoelectric machine comprising:
   a nonmagnetic support structure having a central core and plurality of fir tree projections extending radially from said central core and extending longitudinally in parallel with the axis of said central core;
   a plurality of magnetic pole pieces each having a fir tree groove with a cross-sectional shape corresponding to the cross-sectional shape of one of said fir tree projections, said magnetic pole pieces being mounted on said support structure such that each support structure fir tree projection extends into a corresponding pole piece fir tree groove to prevent radial movement of the pole pieces;
   a plurality of bar-shaped permanent magnets extending longitudinally through slots formed between said pole pieces and extending radially from said central core, wherein the magnetic axis of each of said magnets is circumferentially disposed;
   each of said permanent magnets being secured against radially outward movement by a nonmagnetic retaining wedge extending longitudinally along the outer periphery of the rotor and extending circumferentially between slots in adjacent ones of said magnetic pole pieces; and
   a plurality of tapered drive wedges each positioned between one side of each of said slots in said pole pieces and an adjacent side of one of said retaining wedges, such that a radially inward compressive force is exerted on each of said permanent magnets by one of said retaining wedges.

* * * * *